US008571972B2

(12) United States Patent
Talbert et al.

(10) Patent No.: US 8,571,972 B2
(45) Date of Patent: Oct. 29, 2013

(54) COMPUTER-IMPLEMENTED METHOD, SYSTEM AND APPARATUS FOR THE DYNAMIC VERIFICATION OF A CONSUMER ENGAGED IN A TRANSACTION WITH A MERCHANT AND AUTHORIZATION OF THE TRANSACTION

(75) Inventors: Vincent W. Talbert, Cockeysville, MD (US); Thomas H. Keithly, Monkton, MD (US); Daniel A. Hirschfeld, Timonium, MD (US); Mark L. Lavelle, Govans, MD (US)

(73) Assignee: Bill Me Later, Inc., San Jose, CA (US)

( * ) Notice: Subject to any disclaimer, the term of this patent is extended or adjusted under 35 U.S.C. 154(b) by 1097 days.

(21) Appl. No.: 10/590,162

(22) PCT Filed: Feb. 23, 2004

(86) PCT No.: PCT/US2004/005444
§ 371 (c)(1),
(2), (4) Date: Jul. 12, 2007

(87) PCT Pub. No.: WO2005/084187
PCT Pub. Date: Sep. 15, 2005

(65) Prior Publication Data
US 2007/0288375 A1 Dec. 13, 2007

(51) Int. Cl.
*G06Q 40/00* (2012.01)
(52) U.S. Cl.
USPC ............................................. 705/38; 705/35
(58) Field of Classification Search
USPC ...................................................... 705/38, 35
See application file for complete search history.

(56) References Cited

U.S. PATENT DOCUMENTS

| 3,920,908 A | 11/1975 | Kraus |
| 4,191,860 A | 3/1980 | Weber |

(Continued)

FOREIGN PATENT DOCUMENTS

| EP | 0 338 568 A2 | 10/1989 |
| EP | 0 829 813 A1 | 3/1998 |

(Continued)

OTHER PUBLICATIONS

Carol Power; "Electronic Commerce: Canadian Internet Firm Sets Its Sights on U.S."; American Banker; Mar. 23, 1999; ISSN: 0002-7561.*

(Continued)

*Primary Examiner* — Edward Chang
(74) *Attorney, Agent, or Firm* — Haynes and Boone, LLP

(57) ABSTRACT

Disclosed is a computer-implemented method (100) for the dynamic verification of a consumer engaged in a transaction with a merchant (12) and authorization of the transaction. The method (100) comprises the steps of: providing a consumer transaction data set (16) including a plurality of data fields to a central credit issuer database (14); determining a processing queue (22) based upon the data contained in at least one of the data fields in the consumer transaction data set (16), the processing queue (22) including a plurality of prioritized target transactions (24); comparing at least one data field from the consumer transaction data set (16) directed to the consumer engaged in the prioritized target transaction (24) with at least one data field in at least one of the central credit issuer database (14) and a third party database (26); and determining a consumer/transaction identifier (36) based upon the comparison. A system (10) and apparatus (50) for the verification of a consumer/transaction is also disclosed.

36 Claims, 3 Drawing Sheets

(56) References Cited

U.S. PATENT DOCUMENTS

| | | |
|---|---|---|
| 4,291,198 A | 9/1981 | Anderson et al. |
| 4,757,267 A | 7/1988 | Riskin |
| 4,969,183 A | 11/1990 | Reese |
| 4,996,705 A | 2/1991 | Entenmann et al. |
| 5,010,238 A | 4/1991 | Kadono et al. |
| 5,012,077 A | 4/1991 | Takano |
| 5,120,945 A | 6/1992 | Nishibe et al. |
| 5,329,589 A | 7/1994 | Fraser et al. |
| 5,446,885 A | 8/1995 | Moore et al. |
| 5,537,315 A | 7/1996 | Mitcham |
| 5,793,028 A | 8/1998 | Wagener et al. |
| 5,794,221 A | 8/1998 | Egendorf |
| 5,870,721 A | 2/1999 | Norris |
| 5,883,810 A | 3/1999 | Franklin et al. |
| 5,940,811 A | 8/1999 | Norris |
| 6,000,832 A | 12/1999 | Franklin et al. |
| 6,029,150 A | 2/2000 | Kravitz |
| 6,029,890 A | 2/2000 | Austin |
| 6,032,136 A | 2/2000 | Brake, Jr. et al. |
| 6,078,891 A | 6/2000 | Riordan et al. |
| 6,098,053 A | 8/2000 | Slater |
| 6,105,007 A | 8/2000 | Norris |
| 6,122,624 A | 9/2000 | Tetro et al. |
| 6,188,994 B1 | 2/2001 | Egendorf |
| 6,202,053 B1 | 3/2001 | Christiansen et al. |
| 6,227,447 B1 | 5/2001 | Campisano |
| 6,289,319 B1 | 9/2001 | Lockwood |
| 6,317,783 B1 | 11/2001 | Freishtat et al. |
| 6,332,134 B1 | 12/2001 | Foster |
| 6,341,724 B2 | 1/2002 | Campisano |
| 6,351,739 B1 | 2/2002 | Egendorf |
| 6,477,578 B1 | 11/2002 | Mhoon |
| 6,505,171 B1 | 1/2003 | Cohen et al. |
| 6,675,153 B1 | 1/2004 | Cook et al. |
| 6,704,714 B1 | 3/2004 | O'Leary et al. |
| 6,785,661 B1 | 8/2004 | Mandler et al. |
| 6,820,202 B1 | 11/2004 | Wheeler et al. |
| 6,839,690 B1 | 1/2005 | Foth et al. |
| 6,839,692 B2 | 1/2005 | Carrott et al. |
| 6,868,408 B1 | 3/2005 | Rosen |
| 6,883,022 B2 | 4/2005 | Van Wyngarden |
| 6,889,325 B1 | 5/2005 | Sipman et al. |
| 6,915,272 B1 | 7/2005 | Zilliacus et al. |
| 6,931,382 B2 | 8/2005 | Laage et al. |
| 6,957,334 B1 | 10/2005 | Goldstein et al. |
| 6,970,853 B2 | 11/2005 | Schutzer |
| 6,976,008 B2 | 12/2005 | Egendorf |
| 6,980,970 B2 | 12/2005 | Krueger et al. |
| 7,006,986 B1 | 2/2006 | Sines et al. |
| 7,051,001 B1 | 5/2006 | Slater |
| 7,107,243 B1 | 9/2006 | McDonald et al. |
| 7,177,836 B1 | 2/2007 | German et al. |
| 7,263,506 B2 | 8/2007 | Lee et al. |
| 7,406,442 B1 | 7/2008 | Kottmeier, Jr. et al. |
| 2001/0034702 A1 | 10/2001 | Mockett et al. |
| 2001/0034724 A1 | 10/2001 | Thieme |
| 2002/0007302 A1 | 1/2002 | Work et al. |
| 2002/0007341 A1 | 1/2002 | Lent et al. |
| 2002/0032860 A1 | 3/2002 | Wheeler et al. |
| 2002/0035538 A1 | 3/2002 | Moreau |
| 2002/0052833 A1 | 5/2002 | Lent et al. |
| 2002/0069166 A1 | 6/2002 | Moreau et al. |
| 2002/0087467 A1 | 7/2002 | Mascavage, III et al. |
| 2002/0099648 A1* | 7/2002 | DeVoe et al. ............... 705/38 |
| 2002/0099649 A1* | 7/2002 | Lee et al. ............... 705/38 |
| 2002/0107793 A1 | 8/2002 | Lee |
| 2002/0112160 A2 | 8/2002 | Wheeler et al. |
| 2002/0120537 A1 | 8/2002 | Morea et al. |
| 2002/0120864 A1 | 8/2002 | Wu et al. |
| 2002/0156688 A1 | 10/2002 | Horn et al. |
| 2002/0178071 A1 | 11/2002 | Walker et al. |
| 2002/0198822 A1 | 12/2002 | Munoz et al. |
| 2003/0036996 A1 | 2/2003 | Lazerson |
| 2003/0061157 A1 | 3/2003 | Hirka et al. |
| 2003/0120615 A1 | 6/2003 | Kuo |
| 2003/0144952 A1 | 7/2003 | Brown et al. |
| 2003/0200184 A1 | 10/2003 | Dominguez et al. |
| 2004/0078328 A1 | 4/2004 | Talbert et al. |
| 2004/0111362 A1 | 6/2004 | Nathans et al. |
| 2004/0151292 A1 | 8/2004 | Larsen |
| 2004/0186807 A1 | 9/2004 | Nathans et al. |
| 2005/0071266 A1 | 3/2005 | Eder |
| 2005/0125336 A1 | 6/2005 | Rosenblatt et al. |
| 2005/0131808 A1 | 6/2005 | Villa |
| 2005/0246278 A1 | 11/2005 | Gerber et al. |
| 2006/0184428 A1 | 8/2006 | Sines et al. |
| 2006/0184449 A1 | 8/2006 | Eder |
| 2006/0184570 A1 | 8/2006 | Eder |
| 2006/0266819 A1 | 11/2006 | Sellen et al. |
| 2006/0289621 A1 | 12/2006 | Foss, Jr. et al. |
| 2007/0005445 A1 | 1/2007 | Casper |
| 2008/0046334 A1 | 2/2008 | Lee et al. |
| 2008/0052244 A1 | 2/2008 | Tsuei et al. |

FOREIGN PATENT DOCUMENTS

| | | |
|---|---|---|
| EP | 1223524 A2 | 7/2002 |
| WO | WO 88/10467 A1 | 12/1988 |
| WO | WO 00/02150 A1 | 1/2000 |
| WO | WO 00/67177 A2 | 11/2000 |

OTHER PUBLICATIONS

Gullo, Karen; "Citicorp to test electronic solution to verifying customer signatures"; American Banker; Sep. 24, 1991; ISSN: 0002-7561.*

Trott, Bob; "Vendors to support dynamic HTML"; InfoWorld; Mar. 24, 1997; ISSN: 0199-6649.*

* cited by examiner

COMPUTER-IMPLEMENTED METHOD, SYSTEM AND APPARATUS FOR THE DYNAMIC VERIFICATION OF A CONSUMER ENGAGED IN A TRANSACTION WITH A MERCHANT AND AUTHORIZATION OF THE TRANSACTION

BACKGROUND OF THE INVENTION

1. Field of the Invention

The present invention relates generally to transaction systems and methods for verifying a consumer engaged in a transaction with a merchant in order to authorize both the consumer as well as the transaction and, in particular, to a computer-implemented method, system and apparatus for dynamically verifying a consumer engaged in a transaction with a merchant and authorization of this transaction.

2. Description of Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. prior to the birth of virtual commerce, as discussed below, such payment options provide an adequate convenience and transactional security to consumers and merchants in the market place. While transactional security may include the security offered by a payment method to the consumer that the purchase event will not result in a breach of personal information or that the consumer is a victim of identity theft, transactional security also offers the merchant or seller the security that fraud will not be perpetrated.

Virtual commerce and the growth of the Internet as a medium for commerce have placed pressure on the payment options discussed above on both the convenience and transactional security by the credit issuer. For example, credit cards may be convenient to the consumer, but are subject to fraudulent use via theft of the account number, expiration date and address of the consumer. This, in turn, places the credit issuer at risk of offering credit to an uncreditworthy consumer, being the subject of consumer fraud or providing authorization to a merchant to provide services or ship goods to a fraudulent source.

Currently available payment options include significant shortcomings when applied to remote purchasers, such as purchases where the buyer and the seller (that is, the merchant) are not physically proximate during the transaction. Further, regardless of the proximity of the consumer and the merchant, merchants and credit issuers alike continue to battle the problem of fraudulent purchases. Each new payment option and every new sales channel (in-store, telephone, mail and Internet) have, in turn, spawned innovation on the part of consumers willing to perpetrate fraud in order to obtain goods and services without paying for them.

In recent years, the birth of the Internet commerce industry and the continued growth in mail order and telephone order commerce have pushed the credit card to the forefront of these battles. Typically, merchants are forced to rely on credit cards because it is currently their only option in the remote purchase environment. However, regardless of the type of credit offered, low transactional security is offered to both merchants and consumers. This leads to significant cost for the consumers and the merchants, such as the consumer cost including the impairment of their credit record, the inconvenience of changing all of their credit card accounts and the financial cost in resolving the situation. Merchant costs may include the mitigation of fraud losses, including the cost in incremental labor, hardware and software to implement additional security checks in their sales/order entry software, higher transaction processing expense in the form of discount rates for credit cards and NSF fees for checks and higher fraud charge-offs for undetected fraudulent purchases.

With the continuing speed and ability of a consumer to gain credit, whether at a point-of-sale or through the use of an existing account, identity theft and fraud are on the increase. Fortunately, those that perpetrate this fraud and theft typically target specific consumers, such as the elderly, and engage in specified and easily-recognizable patterns, such as elevated purchase costs at otherwise lower-end shopping facilities in a compressed period of time. Further, many fraud perpetrators and thieves have a specific pattern of buying that is easily assessed by a third party.

Presently, merchants attempt to properly identify a consumer using a credit card or other credit account at the point-of-sale. However, as is easily evident in today's marketplace, merchants are often more interested in providing a consumer with quick and efficient service with little hassle regarding the consumer's identity. Further, merchants do not have the data available to them at the point-of-sale for making an appropriate identification of a consumer or otherwise detecting a fraudulent purchase. While some merchants do use external databases to verify a consumer and authorize the transaction, these databases include errors, have limited information, have data omissions and further include data that may be compromised by an external source. Therefore, there remains a need for a more dynamic verification process for both verifying the consumer and authorizing the transaction prior to final acquisition of the goods and/or services by the consumer.

SUMMARY OF THE INVENTION

It is, therefore, an object of the present invention to provide a computer-implemented method, system and apparatus for the dynamic verification of a consumer engaged in a transaction with a merchant and authorization of the transaction that overcome the deficiencies of the prior art. It is another object of the present invention to provide a method, system and apparatus for the dynamic verification of the consumer and authorization of the transaction that specifically targets and segments the consumer and/or a transaction based upon data received by a credit issuer regarding the consumer and transaction information. It is a still further object of the present invention to provide a method, system and apparatus for verifying a consumer and authorizing a transaction that determines a consumer/transaction identifier based upon a comparison of consumer transaction data and other internal or external gathered data. It is yet another object of the present invention to provide a method, system and apparatus for verifying a consumer and authorizing a transaction that makes this determination prior to the merchant shipping goods to the consumer and/or the services being performed by a merchant for the consumer.

The present invention is directed to a computer-implemented method for the dynamic verification of the consumer engaged in a transaction with a merchant and authorization of the transaction. The method includes the steps of: (a) providing a consumer transaction data set including a plurality of data fields to a central credit issuer database; (b) determining a processing queue based upon the data contained in at least one of the data fields in the consumer transaction data set, where the processing queue includes a plurality of prioritized target transactions; (c) comparing at least one data field from the consumer transaction data set directed to the consumer engaged in the prioritized target transaction with at least one data field in at least one of the central issuer database and a third party database; and (d) determining a consumer/transaction identifier based upon the comparison. Further, this method and specifically the determination of the consumer/transaction identifier is completed prior to goods being shipped by the merchant to the consumer and/or services being performed by the merchant for the consumer. In one preferred and non-limiting embodiment, the method further includes the step of contacting or otherwise communicating with the consumer to verify that the transaction was actually engaged in by the verified consumer.

The present invention is also directed to an apparatus for dynamically verifying a consumer engaged in a transaction with a merchant and authorizing the transaction. The apparatus includes a storage mechanism having a central credit issuer database thereon, and an input mechanism for transmitting the consumer transaction data set including a plurality of data fields to the central credit issuer database. The apparatus further includes a processor mechanism for: (i) determining a processing queue based upon the data contained in at least one of the data fields in the consumer transaction data set, where the processing queue includes a plurality of prioritized target transactions; (ii) comparing at least one data field from the consumer transaction data set directed to the consumer engaged in the prioritized target transaction with at least one data field and at least one of the central credit issuer database and/or a third party database; and (iii) determining a consumer/transaction identifier based upon the comparison. The processor mechanism determines the consumer/transaction identifier prior to goods being shipped by the merchant to the consumer and/or services being performed by a merchant for the consumer.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
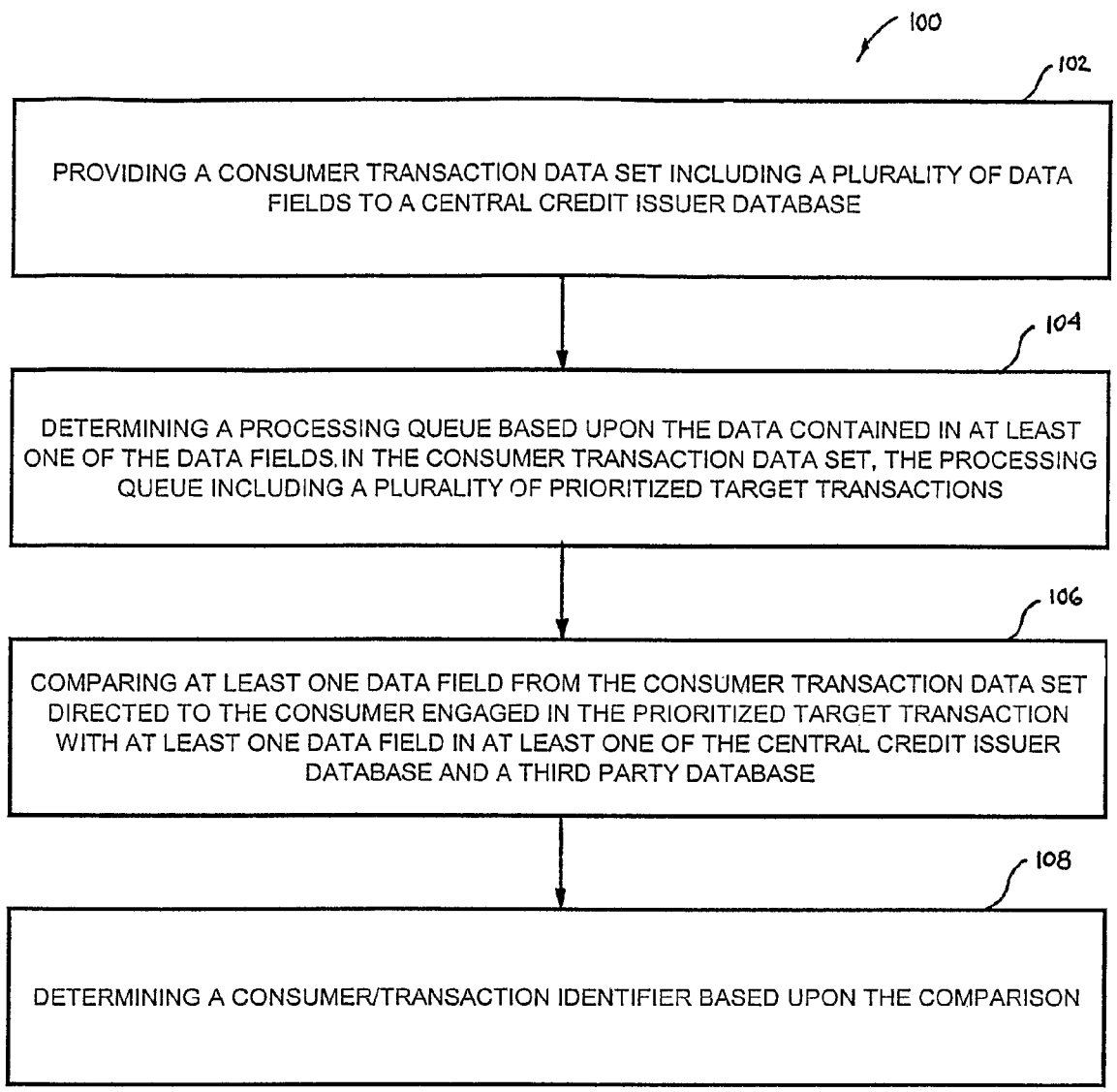
FIG. 1 is a flow diagram of a computer-implemented method for dynamically verifying a consumer engaged in a transaction with a merchant and authorization of this transaction according to the present invention.
Figure 2:
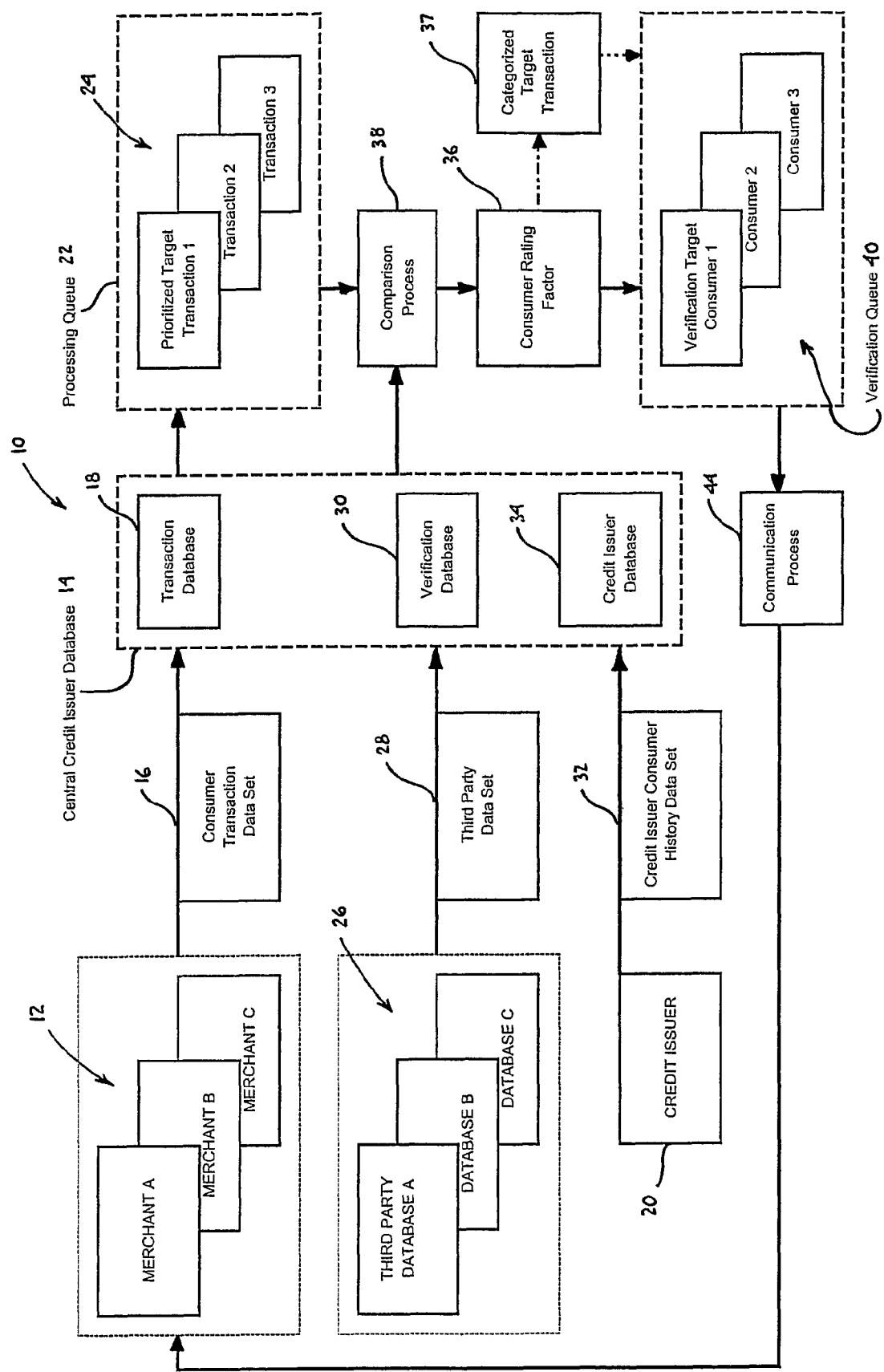
FIG. 2 is a schematic view of the method and system of FIG. 1.
Figure 3:
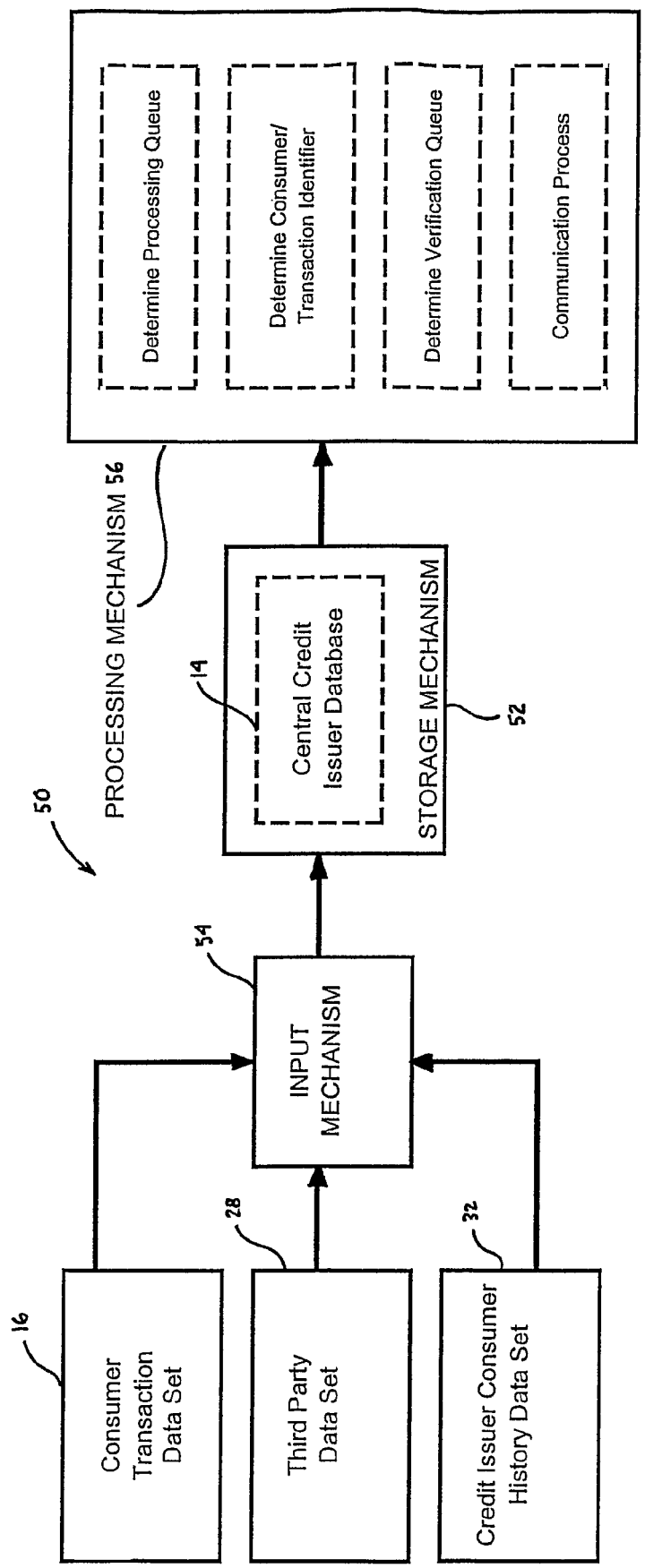
FIG. 3 is a schematic view of an apparatus for dynamically verifying a consumer engaged in a transaction with a merchant and authorizing the transaction according to the present invention.

The present invention is directed to a computer-implemented method for the dynamic verification of a consumer engaged in a transaction with a merchant and authorization of this transaction. The method of the present invention and the schematic view of the system are illustrated in FIGS. 1 and 2. The present invention is also directed to an apparatus for dynamically verifying a consumer engaged in a transaction with a merchant and authorizing this transaction. Such an apparatus is illustrated in schematic form in FIG. 3.

According to the present invention, a method 100 is included for the dynamic verification of a consumer engaged in a transaction with a merchant and authorization of this transaction. According to this method 100 and in one preferred and non-limiting embodiment, the method 100 includes the steps of: providing a consumer transaction data set including a plurality of data fields to a central credit issuer database (Step 102); determining a processing queue based upon the data contained in at least one of the data fields in a consumer transaction data set, the processing queue including a plurality of prioritized target transactions (Step 104); comparing at least one data field from the consumer transaction data set directed to the consumer engaged in the prioritized target transaction with at least one data field in at least one of the central credit issuer database and a third party database (Step 106); and determining a consumer/transaction identifier based upon the comparison (Step 108). This method 100 of dynamically verifying a consumer engaged in a transaction with a merchant and authorization of this transaction is performed immediately upon initiation of the transaction between the merchant and the consumer and the provision of specified data from the merchant to the credit issuer. The credit issuer engages in the method, determines a processing queue, performs the comparison and determines the consumer/transaction identifier prior to the goods being shipped by the merchant to the consumer and/or the services being performed by the merchant for the consumer.

In determining a processing queue, as performed in Step 104, the credit issuer takes into account the data values or information contained in the data fields in the consumer transaction data set that has been transmitted from the merchant. For example, the credit issuer may take into account that the consumer is a first-time purchaser, the consumer is over a certain age, the geographic location of the attempted purchase, the type of goods, the cost of the goods, bill-to not equal to ship-to, etc. Often, such factors are considered risk factors and may be processed as various scenarios in an automated system. Following is a list of example scenarios that assist in determining the processing queue for the transaction and the consumer.

Initially, prior to processing the data through the specific scenarios, in one preferred and non-limiting embodiment, certain "up-front" criteria must be adhered to. For example, in on embodiment, by default, companies A, B and C are excluded from all scenarios unless specifically included. This is based upon the status and relationship between the system and the predetermined companies. Further, in the following scenarios, and as an example of field/application prioritization, Scenario Nos. 21-34 are for all merchants including Flower and ISP merchants, Scenario Nos. 21-33 are for policy approvals (Fair Isaac Risk Score (FICO) Risk Score>=640), and Scenario No. 34 is for test approvals (FICO Risk Score<=639, including 0). The FICO risk score is a statistical estimate of general credit risk available from the credit bureaus. Certain consumers and merchants may be further prioritized or exempted from any of the following scenario analysis. In this embodiment, the ship-to address key should be constructed as follows:

If Ship-to Address < > Bill-to Address
Scan Ship-to address line 1 and line 2 and set line 1 and line 2 flag as follows:
Flag is initialized to 'NULL'
If field is not 'NULL' then flag is set to 'CHAR'
If leftmost character of line is numeric (0 through 9) then flag is set to 'SNUM'
If Line 1 Flag is 'SNUM' then build ship-to key from Line 1
If Line 1 Flag is not 'SNUM' and Line 2 Flag is 'SNUM' then build key from Line 2

Else build key from line 1
Build Key as follows: First ten characters of Ship-to line starting from left and excluding blanks concatenated to Ship-to ZIP Code
Subject to the initial analysis, example scenarios are as follows:
Scenario No. 8 (Review Context=CB No Hit, Non-ISP, New)
In this scenario we are looking at transactions that meet the following criteria:
Approved (provisional approval of customer's purchase request)
FICO Risk Score<=639 (including 0)
Amount>$50/2
Merchant Customer Type=N
BML Customer Type=N
Merchant is not Company A
Incremental Transaction since last report documented in database
Scenario No. 9 (Review Context=CB No Hit (no information at the credit bureau), ISP)
In this scenario we are looking at transactions that meet the following criteria:
Approved
FICO<=639 (including 0)
Amount>$0
Merchant Customer Type=N
BML Customer Type=N
Merchant is Company A
Incremental Transaction since last report
Scenario No. 10 (Review Context=Approved after one or more declines)
In this scenario we are looking at transactions that meet the following criteria:
Approved
Prior Declines exist to same Ship-to Address Key or E-mail Address within the last 48 hours
Amount>$5
BML Customer Type=N
Scenario No. 11 (Review Context=Multiple Approvals to same Ship-to Address Key)
In this scenario we are looking at transactions that meet the following criteria:
Approved
At least one prior approval exists within the last 48 hours to the same ship-to address key or E-mail or home telephone
Amount>$5
BML Customer Type=N
Scenario No. 12 (Review Context=CB No Hit, Flower)
In this scenario we are looking at transactions that meet the following criteria:
Approved
Amount>$300/4
BML Customer Type=N
Merchant is Companies B or C
Incremental Transaction since last report
Scenario No. 13 (Review Context=CB No Hit, Non-ISP, Existing)
In this scenario we are looking at transactions that meet the following criteria:
Approved
FICO<=639 (including 0)
Amount>$50
Merchant Customer Type=E
BML Customer Type=N
Merchant is not Company A
Incremental Transaction since last report
Scenario No. 14 (Review Context=CB Hit, ISP, CB Verification)
In this scenario we are looking at transactions that meet the following criteria:
Approved
SSN Match=N OR SSN4Match=N OR DOB Match=N on internal database/table (Zoot Response XML table)
Amount>$0
Merchant Customer Type=N
BML Customer Type=N
Merchant is Company A
Incremental Transaction since last report
Scenario No. 15 (Review Context=CB Hit, ISP, Geo Risk)
In this scenario we are looking at transactions that meet the following criteria:
Approved
Geo Risk (geographical fraud risk factor)=3
Amount>$0
Merchant Customer Type=N
BML Customer Type=N
Merchant is Company A
Incremental Transaction since last report
Scenario No. 16 (Review Context=Elder Abuse)
In this scenario we are looking at transactions that meet the following criteria:
Approved
Year(App Date)−Year(DOB)>=65
Amount>$0
Merchant is NOT Specified Person or Merchant ID
Incremental Transaction since last report
Scenario No. 17 (Review Context=BT=ST Address, Flower)
In this scenario we are looking at transactions that meet the following criteria:
Approved
Amount>$25
BML Customer Type=N
Bill-to Address=Ship-to Address
Merchant is Companies B or C
Incremental Transaction since last report
Scenario No. 21 (Review Context=Fraud–High Amount)
In this scenario we are looking at transactions that meet the following criteria:
Approved
BML Customer Type=N
Merchant ID is NOT xxxxxx
Incremental Transaction since last report
FICO>=640
Amount>=150
Scenario No. 21b (Review Context=Fraud–High Amount–KW)
In this scenario we are looking at transactions that meet the following criteria:
Approved
BML Customer Type=N
Merchant ID is xxxxx
Incremental Transaction since last report
FICO>=640
Amount>=500
Scenario No. 22 (Review Context=Fraud–Medium Amount 1)
In this scenario we are looking at transactions that meet the following criteria:
Approved
BML Customer Type=N Incremental Transaction since last report
FICO>=640
Amount=83-149.99
BT Address=ST Address
Age of Oldest Trade (oldest credit account in a person's credit report)>=197
Total Bankcard Balance (total bankcard balance in person's credit report)<=864

Scenario No. 23 (Review Context=Fraud–Medium Amount 2)
In this scenario we are looking at transactions that meet the following criteria:
Approved
BML Customer Type=N
Incremental Transaction since last report
FICO>=640
Amount=83-149.99
BT Address=ST Address
Age of Oldest Trade>=197
Total Bankcard Balance>=865
Geo Risk=3

Scenario No. 24 (Review Context=Fraud–Medium Amount 3)
In this scenario we are looking at transactions that meet the following criteria:
Approved
BML Customer Type=N
Incremental Transaction since last report
FICO>=640
Amount=83-149.99
BT Address< >ST Address
Merchant ID is xxxxx, xxxxy, xxxxz OR FICO>=775

Scenario No. 25 (Review Context=Fraud–Medium Amount 4)
In this scenario we are looking at transactions that meet the following criteria:
Approved
BML Customer Type=N
Incremental Transaction since last report
FICO>=640
Amount=43-82.99
Disaster Frequency (statistical measure of delinquency in credit report)>=2

Scenario No. 26 (Review Context=Fraud–Low Amount 1)
In this scenario we are looking at transactions that meet the following criteria:
Approved
BML Customer Type=N
Incremental Transaction since last report
FICO>=640
Amount<=42.99
Total Bankcard Balance<=155
Age of Oldest Trade>=197

Scenario No. 27 (Review Context=Fraud–Low Amount 2)
In this scenario we are looking at transactions that meet the following criteria:
Approved
BML Customer Type=N
Incremental Transaction since last report
FICO>=640
Amount<=42.99
Total Bankcard Balance>=156
GeoRisk=3
FICO>=775

Scenario No. 28 (Review Context=Straight Roller–Thin)
In this scenario we are looking at transactions that meet the following criteria:
Approved
BML Customer Type=N
Incremental Transaction since last report
FICO>=640
Credit Segment (credit lifestage for applicant (e.g., new to credit, established, delinquent, etc.)=1

Scenario No. 29 (Review Context=Straight Roller–Clean 1)
In this scenario we are looking at transactions that meet the following criteria:
Approved
BML Customer Type=N
Incremental Transaction since last report
FICO>=640
Credit Segment=2
Amount>=193

Scenario No. 30 (Review Context=Straight Roller–Clean 2)
In this scenario we are looking at transactions that meet the following criteria:
Approved
BML Customer Type=N
Incremental Transaction since last report
FICO>=640
Credit Segment=2
Amount=16-192.99
Total Bankcard Balance=0

Scenario No. 31 (Review Context=Straight Roller–Clean 3)
In this scenario we are looking at transactions that meet the following criteria:
Approved
BML Customer Type=N
Incremental Transaction since last report
FICO>=640
Credit Segment=3
FICO<=680

Scenario No. 32 (Review Context=Straight Roller–Clean 4)
In this scenario we are looking at transactions that meet the following criteria:
Approved
BML Customer Type=N
Incremental Transaction since last report
FICO>=640
Credit Segment=4-6
Amount>=25

Scenario No. 33 (Review Context=Straight Roller–Dirty)
In this scenario we are looking at transactions that meet the following criteria:
Approved
BML Customer Type=N
Incremental Transaction since last report
FICO>=640
Credit Segment=7-9

Scenario No. 34 (Review Context=Test Approval)
In this scenario we are looking at transactions that meet the following criteria:
Approved
BML Customer Type=N
Incremental Transaction since last report
FICO<=639 (including 0)

Scenario No. 35 (Review Context=International Shipping)

In this scenario we are looking at transactions that meet the following criteria:
  Approved
  BML Customer Type=N
  Incremental Transaction since last report
  Ship-to Country < > USA The present invention is also directed to a system 10 for dynamically verifying a consumer engaged in a transaction with a merchant 12 and authorization of this transaction, as illustrated in a preferred and non-limiting embodiment in FIG. 2. Referring to FIG. 2, after the consumer initiates a transaction, the merchant 12 transmits specific data to the central credit issuer database 14. Specifically, the data transmitted from the merchant 12 to the central credit issuer database 14 is referred to as a consumer transaction data set 16. The consumer transaction data set 16 may include many different data fields having a variety of values, data and information contained therein. For example, the consumer transaction data set 16 may include the consumer's name, account number, address, city, state, zip code, telephone number, e-mail address, social security number, date of birth, the merchant's name, identification, order number, authorization number, authorization date, authorization time, authorization amount, ship-to address, bill-to address, transaction amount, etc. In essence, the data contained in the consumer transaction data set 16, as transmitted to the central credit issuer database 14, includes enough information to enable the remaining steps in the method and system 10 of the present invention.

In addition, the consumer transaction data set 16 is communicated to a transaction database 18, which exists as a data subset or sub-database resident on the central credit issuer database 14. Therefore, the central credit issuer database 14 acts as the data warehouse that is operated by, preferably, the credit issuer 20. Once a sufficient amount of information and data is obtained through the consumer transaction data set 16, the system 10 determines a processing queue 22 that is based upon the data contained in one or more of the data fields in the consumer transaction data set 16. The processing queue 22 includes multiple prioritized target transactions 24, and these prioritized target transactions 24 are determined as discussed above in connection with Step 104 of the method 100 of the present invention.

After the processing queue 22 is determined, the system 10 engages in the analysis of a specific prioritized target transaction 24. Specifically, the system 10 compares one or more data fields from the consumer transaction data set 16 that is directed to the consumer engaged in the prioritized target transaction 24 with one or more data fields in further databases. In order to gather this verification data, the system 10 of the present invention may include one or more third party databases 26 that transmit a third party data set 28 to a verification database 30, which is typically resident on the central credit issuer database 14. As with the transaction database 18, the verification database 30 is a subset or sub-database of the central credit issuer database 14.

It should be noted, however, that the credit issuer 20 may also gather previous data regarding the consumer or the transaction based upon former transactions or other segments. Therefore, the credit issuer 20 may also transmit a credit issuer credit history data set 32 to a credit issuer database 34, also resident on the central credit issuer database 14. Again, as with the transaction database 18 and the verification database 30, the credit issuer database 34 is a subset or sub-database on the central credit issuer database 14. Still further, while illustrated as a separate entity in the system 10 of the present invention, the credit issuer database 34, as well as the credit issuer credit history data set 32, represents information already available to and stored on the central credit issuer database 14. The central credit issuer database 14 (as well as the third party database 26) may include many different fields populated by data useful in connection with the method 100 and system 10 of the present invention. For example, the data may reflect a consumer's name, an account number, an address, a city, a state, a zip code, a telephone number, an e-mail address, a social security number, a date of birth, the merchant's name, an identification, an order number, an authorization number, an authorization date, an authorization time, an authorization amount, a ship-to address, a bill-to address, a transaction amount, a company identity, a merchant identity, a third party risk score, a general credit risk score, a credit bureau risk score, a prior approval, a merchant type, a customer type, prior report data, previous transaction data, a geographical risk factor, credit account data, bankcard balance data, delinquency data, credit segment data, and ship-to country.

Once this information and data is gathered, a specified prioritized target transaction 24 is analyzed as discussed above. This comparison yields a consumer/transaction identifier, which indicates how the prioritized target transaction 24 should be handled. For example, the consumer/transaction identifier 36 may indicate that, based upon the analyzed data, the prioritized target transaction 24 should be approved and the consumer has been verified. In addition the prioritized target transaction 24 may be categorized based upon the consumer/transaction identifier 36, thereby providing a categorized target transaction 37. Next, an action may be performed based upon the categorized target transaction 37, and specifically the assigned identity or category of the categorized target transaction. For example, the action may include: (i) interacting with the merchant 12; (ii) interacting with the customer; (iii) communicating with the merchant 12; (iv) communicating with the customer; (v) gathering additional transaction data; (vi) gathering additional customer data; (vii) gathering additional merchant data; (viii) approving the categorized target transaction 37; (ix) denying the categorized target transaction 37; (x) queuing the categorized target transaction 37 for further delayed action; (xi) interacting with the central credit issuer database 14; and (xii) requesting further data from at least one of the customer, the merchant 14, the credit issuer 20, a credit issuer database, a third party and a third party database 26.

However, if, based upon the comparison process 38 and the resulting consumer/transaction identifier 36, the system 10 determines that further processing or an action is required, the prioritized target transaction 24 and/or the categorized target transaction 37, together with the consumer data, will be used to determine a verification queue 40. As with the processing queue 22, the verification queue 40 prioritizes or ranks verification target consumers 42 for further contact or communication. Once queued, the communication process 44 begins to further verify the verification target consumer 42 and the associated prioritized target transaction 24 and/or the categorized target transaction 37, considered the verification target transaction.

If the verification target consumer 42 is verified, and further, the transaction that was allegedly engaged in by the verified target consumer 42 is authorized, the overall authorization process continues as is known in the art. However, the communication process 44 may also include, besides physical or telephonic contact with the verified target consumer 42, a telephonic contact with the merchant 12. At this point, the merchant 12 may gather additional information from the verification target consumer 42 and re-send specified data to the credit issuer 20 for further verification of the consumer in the transaction. For example, if the verification target consumer 42 has a different address in the consumer transaction data set 16 and the credit issuer credit history data set 32 and/or the third party data set 28, this may prompt a further contact with the consumer and/or the merchant 12. Both the processing queue 22 and the verification queue 40 may be determined dynamically and modified in a real-time format. Further, both the processing queue 22 and the verification queue 40 may be determined based upon a set of predetermined rules directed to one or more of the data fields in the consumer transaction data set 16, the central credit issuer database 14 and/or the consumer/transaction identifier 36.

The consumer/transaction identifier 36 is utilized by the user to further act on the transaction or the consumer. For example, an indicator may be provided to the user, and the indicator is based upon the determined consumer/transaction identifier 36. In addition, the indicator may be a visual indicator, such as a letter, a symbol, a term, a word, a phrase, a number, a color, a picture and a visual representation, and/or an audio indicator, such as a sound, an alarm, an audio file, a digital sound, and an analog sound. The indicator may be easily identifiable by the user and used to indicate that the user should perform further verification, approve the transaction, deny the transaction, etc.

Various data fields and information can be used in this communication/verification process 44. For example, the following data elements may represent information that is displayed to a verification representative on an application screen:

| Field Name | Positions | Format | Description |
|---|---|---|---|
| BML Acct Num | 1-16 | 9(16) | FDR Account |
| Name | 17-56 | X(40) | |
| Addr1 | 57-96 | X(40) | |
| Addr2 | 97-136 | X(40) | |
| City | 137-154 | X(18) | |
| State | 155-156 | X(2) | |
| Zip | 157-161 | 9(5) | |
| Phone | 162-171 | X(10) | |
| Email Addr | 172-221 | X(50) | |
| SSN | 222-230 | 9(9) | |
| DOB | 231-238 | 9(8) | CCYYMMDD |
| Merchant Name | 239-258 | X(20) | |
| *Merchant ID | 259-273 | 9(15) | |
| Merchant Order | 274-298 | X(25) | |
| *Authorization Num | 299-304 | X(6) | |
| Auth Date | 305-312 | 9(8) | CCYYMMDD |
| Auth Time | 313-318 | 9(6) | HHMMSS |
| Auth Amount | 319-330 | 9(10)v99 | |
| *Ship To = Bill To | 331-331 | X(1) | T/F |
| Ship To Name | 332-371 | X(40) | |
| Ship To Addr1 | 372-411 | X(40) | |
| Ship To Zip | 412-417 | 9(5) | |
| Strategy Code | 418-422 | X(5) | |
| Risk Level | 423-427 | X(5) | |
| *Identifier 1 | 428-450 | X(23) | Future Use |

*Fields with an asterisk do not need to be displayed on the verification representatives' screen.

The present invention is also directed to an apparatus 50 for dynamically verifying a consumer engaged in a transaction with a merchant 12 and authorizing the transaction. The apparatus includes a storage mechanism 52 having the central credit issuer database 14 stored thereon or therein. Further, the apparatus 50 includes an input mechanism 54 for transmitting the consumer transaction data set 16, the third party data set 28 and the credit issuer credit history data set 32 to the central credit issuer database 14. A processor mechanism 56 determines the processing queue 22 based upon the data contained in one or more of the data fields in the consumer transaction data set 16. As discussed above, the processing queue 22 includes multiple prioritized target transactions 24. The processor mechanism 56 also engages in the comparison process 38 by comparing one or more data fields from the consumer transaction data set 16 directed to the consumer engaged in the prioritized target transaction 24 with one or more data fields in the central credit issuer database 14 or a third party database 26. Finally, the processor mechanism 56 determines a consumer/transaction identifier 36 based upon the comparison process 38.

In a preferred and non-limiting embodiment, the processor mechanism 56 is also equipped to determine the verification queue 40 and engage in at least a portion of the communication process 44 as discussed above in connection with the system 10 and method 100 of the present invention. Further, the processor mechanism 56 may be a computing device, personal computer, networked system, a networked device, a laptop, a palmtop, a personal digital assistant, etc. Similarly, the input mechanism 54 may be a direct-input device, such as a keyboard, or a transmission device, such as a modem, network, the Internet, etc. All of the input mechanism 54, storage mechanism 52 and the processor mechanism 56 are processing units as is known in the art.

The present system 10, apparatus 50 and method 100 are all time sensitive processes and systems, where timing is critical in order to stop the shipment of goods or initiation of services that fail the verification and authorization process. For this reason, in a preferred and non-limiting embodiment, the processing queue 22 is updated in a real-time format. New prioritized target transactions 24 can be added to the existing processing queue 22 individually or in groups without refreshing the processing queue 22. For example, a new prioritized target transaction 24 can be written to the processing queue 22 in real-time or, alternatively, a file of new target transactions 24 can be added to the processing queue 22 periodically, such as every thirty minutes. In another preferred and non-limiting embodiment, the processing queue 22 is not limited to a pure first-in-first-out or last-in-first-out-type scheme, instead being prioritized by a set of rules that include time on the processing queue 22 plus segmentation and analysis.

In a further embodiment, live representatives work the processing queue 22 and/or the verification queue 40 on a computer display. When the representative completes a case, the next highest priority case in the processing queue 22 and/or verification queue 40 appears on the screen. In the data authentication process, the representatives may use both the data in the credit issuer database 34 and/or the third party database 28 in order to authenticate the information provided by the customer to the merchant 12 at the time of purchase. The information regarding the customer, the purchase (transaction) and the shipping address may be displayed on the screen. Next, the representative performs database lookups of fields, such as social security number, telephone number, name, address, etc. The representative then determines if all of the customer or consumer details match the information found in the database.

The system 10 allows the representative to easily select which data must be verified by clicking option buttons on a graphical user interface. When the representative completes the data verification, they would then click the "ok" button to process the information. After the representatives input the correct information, a set of decision rules may make a decision whether to approve, fail, re-queue or proceed to the next step, all based upon the information provided by the representative. Further, the rules engine may instruct the representative to perform a customer contact based upon the previous information.

As discussed above, the consumer/transaction identifier 36 may take the form of a color-coded indicator, a graphical indication, an alphanumeric field, an audio indicator or other indication of how a representative for the system 10 should proceed. For example, the rules engine may instruct the representative to perform a customer contact based upon the information by any available channel, such as telephone, e-mail, chat, instant messaging, etc. The representative will log the outcome of the attempt, such as whether contact was successful, the telephone was out of service, the e-mail bounced back, an answering machine picked up, and other possible outcomes. If the representative reaches the customer, they will log whether the customer recognizes the transaction.

If the customer cannot be contacted, or if a third party instructs the call at a later time, the case may be pended for a time period in the verification queue 40. After the time period expires, the case will be presented to a representative to contact the customer again. The system rules will limit the number of re-queue attempts and the total lapse time before the case will be forced to a pass or fail decision. An inbound contact number will be available for customers to initiate an inbound callback, and the representatives will have search capabilities to find and update the verification case.

Cases that fail verification would be immediately referred to merchants 12 to halt the shipping of the goods. Next, merchants 12 will provide contact e-mail addresses and telephone numbers that will be used for notification. If the merchant 12 prefers a telephone contact, this information is displayed to representatives. If the merchant 12 prefers an e-mail contact, the e-mail is automatically sent by the computer system and processing mechanism 56.

The information that is verified by the representative, customer contact information and the prioritized target transaction 24 outcome, such as the consumer/transaction identifier 36, are all tracked in a database and periodically updated in the central credit issuer database 14, which acts as the data warehouse. In addition, this information is used to evaluate the effectiveness of the program rules and resulting consumer/transaction identifiers 36 for identifying gaps that may be closed when fraud cases are reported in the future. Further, the tracking supports periodic reporting of the number of cases worked, the pass-fail rates, the number of cases that were stopped before shipping, and the number of fraud cases that were not prevented.

In this manner, the present invention provides a computer-implemented method 100, system 10 and apparatus 50 for dynamically verifying a consumer engaged in a transaction with a merchant 12 and authorization of the transaction. The present invention specifically targets and segments transactions and consumers based upon information provided. In addition, the present invention provides a consumer/transaction identifier 36 that is based upon the comparison used to further process and verify the consumer and authorize the transaction. Further, since the present invention is engaged in a real-time and dynamic fashion, fraud is mitigated since the merchant 12 is notified prior to shipping the goods or engaging in the services. Based upon the results of the comparison in the comparison process 38 and further based upon the consumer transaction data set 16, further communication with the consumer may be initiated and further information requested by the merchant 12 from the consumer. Overall, the system 10, apparatus 50 and method 100 serve to reduce fraud and analyze a transaction in a dynamic manner.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A computer-implemented method for the dynamic verification of a consumer engaged in a transaction with a merchant and authorization of the transaction, the method comprising the steps of:
    (a) receiving a consumer transaction data set including a plurality of data fields into a central credit issuer database;
    (b) determining, by a processor of a credit issuer, a processing queue based upon the data contained in at least one of the data fields in the consumer transaction data set, the processing queue including a plurality of prioritized target transactions;
    (c) comparing, by the processor, at least one data field from the consumer transaction data set directed to the consumer engaged in the prioritized target transaction with at least one data field in at least one of the central credit issuer database and a third party database;
    (d) determining, by the processor, an identifier based upon the comparison;
    (e) transmitting, by the processor, information based on the identifier to the merchant instructing the merchant of an action to take, wherein the transmitting is completed prior to at least one of goods being shipped by the merchant to the consumer and services being performed by the merchant and wherein the action is based on at least the processing queue determined by the credit issuer; and
    (f) if further action is needed, determining a verification queue of prioritized verification target consumers at least partially based upon the identifier and performing an action directed to at least one of the verification target consumers and a verification target transaction, wherein the verification queue is dynamically determined and modified in a real-time format and determined based upon a set of predetermined rules directed to at least one of the data fields of at least one of the consumer transaction data set, the central credit issuer database and the identifier.

2. The method of claim 1, further comprising the step of contacting the consumer to verify the transaction based upon the identifier in step (d).

3. The method of claim 1, wherein at least one of steps (b)-(d) are performed by a central credit issuer.

4. The method of claim 1, wherein at least one of steps (a)-(d) are automatically performed by a computing device.

5. The method of claim 4, wherein the computing device is at least one of a personal computer, a networked device, a laptop, a palmtop, a personal digital assistant and a server.

6. The method of claim 1, wherein the consumer transaction data set includes at least one field populated with data reflecting the transaction and/or the consumer.

7. The method of claim 1, wherein the central credit issuer database includes a plurality of fields populated with data reflecting the consumer.

8. The method of claim 1, wherein the third party database includes a plurality of fields populated with data reflecting the consumer.

9. The method of claim 1, wherein the central credit issuer database includes at least one sub-database containing at least one field therein.

10. The method of claim 9, wherein the central credit issuer database includes at least one of:
   (i) a transaction database including fields populated by data reflecting transaction information;
   (ii) a verification database including fields populated by data reflecting verification information; and
   (iii) a credit issuer database including fields populated by data reflecting credit issuer information.

11. The method of claim 1, further comprising the step of receiving a third party data set from at least one third party database into the central credit issuer database.

12. The method of claim 1, further comprising the step of receiving a credit issuer consumer credit history data set from a credit issuer into the central credit issuer database.

13. The method of claim 1, further comprising the step of categorizing the prioritized target transaction based upon the identifier, thereby providing a categorized target transaction.

14. The method of claim 13, wherein an action is performed based upon the categorized target transaction.

15. The method of claim 14, wherein the action is at least one of:
   (i) interacting with the merchant;
   (ii) interacting with the customer;
   (iii) communicating with the merchant;
   (iv) communicating with the customer;
   (v) gathering additional transaction data;
   (vi) gathering additional customer data;
   (vii) gathering additional merchant data;
   (viii) approving the categorized transaction;
   (ix) denying the categorized transaction;
   (x) queuing the categorized transaction for further delayed action;
   (xi) interacting with the central credit issuer database; and
   (xii) requesting further data from at least one of the customer, the merchant, a credit issuer, a credit issuer database, a third party and a third party database.

16. The method of claim 1, wherein the processing queue is dynamically determined and modified in a real-time format.

17. The method of claim 1, wherein the processing queue is determined based upon a set of predetermined rules directed to at least one of the data fields of the consumer transaction data set.

18. The method of claim 1, further comprising the step of providing an indicator to a user, the indicator based upon the determined identifier.

19. The method of claim 18, wherein the indicator is at least one of:
   (i) a visual indicator that is at least one of a letter, a symbol, a term, a word, a phrase, a number, a color, a picture and a visual representation; and
   (ii) an audio indicator that is at least one of a sound, an alarm, an audio file, a digital sound, and an analog sound.

20. An apparatus for dynamically verifying a consumer engaged in a transaction with a merchant and authorizing the transaction, the apparatus comprising: a storage mechanism including a central credit issuer database; an input mechanism for transmitting a consumer transaction data set including a plurality of data fields to the central credit issuer database; and a processor mechanism configured to:
   (i) determine a processing queue based upon the data contained in at least one of the data fields in the consumer transaction data set, the processing queue including a plurality of verification target transactions;
   (ii) compare at least one data field from the consumer transaction data set directed to the consumer engaged in the verification target transaction with at least one data field in at least one of the central credit issuer database and a third party database;
   (iii) determine an identifier based upon the comparison;
   (iv) transmit information based on the identifier to the merchant instructing the merchant of an action to take, wherein the processor mechanism transmits the information prior to goods being shipped by the merchant to the consumer and/or services being performed by the merchant and wherein the action is based on at least the processing queue determined by the credit issuer; and
   (v) if further action is needed, determine a verification queue of prioritized verification target consumers at least partially based upon the identifier and perform an action directed to at least one of the verification target consumers and a verification target transaction, wherein the verification queue is dynamically determined and modified in a real-time format and determined based upon a set of predetermined rules directed to at least one of the data fields of at least one of the consumer transaction data set, the central credit issuer database and the identifier.

21. The apparatus of claim 20, wherein the processor mechanism is a computing device.

22. The apparatus of claim 21, wherein the computing device is at least one of a personal computer, a networked device, a laptop, a palmtop, a personal digital assistant and a server.

23. The apparatus of claim 20, wherein the input mechanism is at least one of a direct-input device, a keyboard, a transmission device, a modem, a network and the Internet.

24. The apparatus of claim 20, wherein the consumer transaction data set includes at least one field populated with data reflecting the consumer.

25. The apparatus of claim 20, wherein the central credit issuer database includes a plurality of fields populated with data reflecting the consumer.

26. The apparatus of claim 20, wherein the third party database includes a plurality of fields populated with data reflecting the consumer.

27. The apparatus of claim 20, wherein the central credit issuer database includes at least one sub-database containing at least one field therein.

28. The apparatus of claim 27, wherein the central credit issuer database includes at least one of:
   (i) a transaction database including fields populated by data reflecting transaction information;
   (ii) a verification database including fields populated by data reflecting verification information; and
   (iii) a credit issuer database including fields populated by data reflecting credit issuer information.

29. The apparatus of claim 20, wherein the prioritized target transaction is categorizing based upon the identifier, thereby providing a categorized target transaction.

30. The apparatus of claim 29, wherein an action is performed based upon the categorized target transaction.

31. The apparatus of claim 30, wherein the action is at least one of:
   (i) interacting with the merchant;
   (ii) interacting with the customer;
   (iii) communicating with the merchant;
   (iv) communicating with the customer;
   (v) gathering additional transaction data;
   (vi) gathering additional customer data;
   (vii) gathering additional merchant data;
   (viii) approving the categorized transaction;
   (ix) denying the categorized transaction;

(x) queuing the categorized transaction for further delayed action;

(xi) interacting with the central credit issuer database; and (xii) requesting further data from at least one of the customer, the merchant, a credit issuer, a credit issuer database, a third party and a third party database.

32. The apparatus of claim 20, wherein the processing queue is dynamically determined and modified in a real-time format.

33. The apparatus of claim 20, wherein the processing queue is determined based upon a set of predetermined rules directed to at least one of the data fields of the consumer transaction data set.

34. The apparatus of claim 20, wherein the processor mechanism is further configured to generate an indicator to a user, the indicator based upon the determined identifier.

35. The apparatus of claim 34, wherein the indicator is at least one of: (i) a visual indicator that is at least one of a letter, a symbol, a term, a word, a phrase, a number, a color, a picture and a visual representation; and (ii) an audio indicator that is at least one of a sound, an alarm, an audio file, a digital sound, and an analog sound.

36. An apparatus for dynamically verifying a consumer engaged in a transaction with a merchant and authorizing the transaction, the apparatus comprising:

means for receiving a consumer transaction data set including a plurality of data fields into a central credit issuer database;

means for determining a processing queue based upon the data contained in at least one of the data fields in the consumer transaction data set, the processing queue including a plurality of prioritized target transactions;

means for comparing at least one data field from the consumer transaction data set directed to the consumer engaged in the prioritized target transaction with at least one data field in at least one of the central credit issuer database and a third party database;

means for determining an identifier based upon the comparison; and means for transmitting information based on the identifier to the merchant instructing the merchant of an action to take, wherein the transmitting is completed prior to at least one of goods being shipped by the merchant to the consumer and services being performed by the merchant and wherein the action is based on at least the processing queue determined by the credit issuer; and means for determining a verification queue of prioritized verification target consumers and performing an action directed to at least one of the verification target consumers and a verification target transaction, wherein the verification queue is dynamically determined and modified in a real-time format and determined based upon a set of predetermined rules directed to at least one of the data fields of at least one of the consumer transaction data set, the central credit issuer database and the identifier if further action is needed.

* * * * *